United States Patent [19]
Eckhart

[11] Patent Number: 5,555,292
[45] Date of Patent: Sep. 10, 1996

[54] PABX WITH VOICE MAIL DEVICE

[75] Inventor: Wolfgang Eckhart, Vienna, Austria

[73] Assignee: Alcatel N.V., Rijswijk, Netherlands

[21] Appl. No.: 541,110

[22] Filed: Oct. 11, 1995

Related U.S. Application Data

[63] Continuation-in-part of Ser. No. 443,327, May 17, 1995, abandoned.

[30] Foreign Application Priority Data

Jun. 1, 1995 [AT] Austria ................... 1120/94

[51] Int. Cl.$^6$ ............... H04M 1/64; H04M 3/42
[52] U.S. Cl. ............... 379/67; 379/88; 379/89; 379/209; 379/210; 379/211
[58] Field of Search ............... 379/67, 88, 89, 379/201, 209, 210, 211, 212, 219, 225, 208, 142, 127

[56] References Cited

U.S. PATENT DOCUMENTS

| | | | |
|---|---|---|---|
| 4,068,101 | 1/1978 | Chemarin | 179/18 |
| 4,580,012 | 4/1986 | Matthews | 379/89 |
| 4,580,016 | 4/1986 | Williamson | 379/31 |
| 4,998,272 | 3/1991 | Hawkins, Jr. et al. | 379/88 |
| 5,083,308 | 1/1992 | Gaulke et al. | 379/266 |
| 5,222,120 | 6/1993 | McLeod | 379/88 |
| 5,268,957 | 12/1993 | Albrecht | 379/67 |
| 5,375,161 | 12/1994 | Fuller | 379/211 |
| 5,400,393 | 3/1995 | Knuth et al. | 379/88 |

FOREIGN PATENT DOCUMENTS

| | | |
|---|---|---|
| 0087849 | 9/1983 | European Pat. Off. . |
| 0304653 | 3/1989 | European Pat. Off. . |
| 0336524 | 10/1989 | European Pat. Off. . |

*Primary Examiner*—Krista M. Zele
*Assistant Examiner*—Parag Dharia
*Attorney, Agent, or Firm*—Ware, Fressola, Van, Der Sluys & Adolphson

[57] ABSTRACT

A telephone exchange (1) with a voice mail device (7), which is able to store voice messages arriving from a first subscriber (2) and intended for a second subscriber (3), in a mailbox (9) assigned to the second subscriber (3), and to send the voice messages to the second subscriber on the second subscriber's request. The telephone exchange (1) is controlled by a control device (5) which contains a control program (10) for controlling the desired mailbox (9), as well as a call number directory (6) that is controlled by the control program (10). In case all links (x, y, z) to the voice mail device (7) should be busy when the first subscriber (2) calls, who then orders a call-back, the control program (10) stores both the telephone number of the voice mail device (7) and the telephone number of the second subscriber (3) and, after a connection path (x, y, z) becomes available, keeps it open for the first subscriber (2), then calls him and, after the first subscriber (2) has picked up his telephone handset, automatically connects him with the voice mail device (7). The control program (10) controls a telephone number directory (6) to send the call number of the second subscriber (3) to the voice mail device (7), which then connects the first subscriber (2) with the mailbox (9) of the second subscriber (3).

3 Claims, 3 Drawing Sheets

PABX WITH VOICE MAIL DEVICE

This is a continuation-in-part of application Ser. No. 08/443,327 filed on May 17, 1995 now abandoned.

TECHNICAL FIELD

The invention concerns a method for storing voice messages in a telephone exchange with speech storage equipment or a voice mail device, which is able to store voice messages arriving from a first or calling subscriber and intended for a second or called subscriber in a mailbox assigned to the second subscriber, and to send them to the second subscriber upon his request, wherein the telephone exchange is controlled by a control device which contains a control process, e.g., in the form of programmed instructions for controlling the desired mailbox, as well as a call number directory, which is used by the control process where, in case all connections to the voice mail device are busy when the first subscriber makes a call, and the first subscriber needs to call back, the control process stores the call number of the voice mail equipment, and, after a connection path becomes available, keeps it open for the first subscriber, calls the first subscriber and connects him with the voice mail equipment after he lifts the receiver. Furthermore, the invention also concerns a telephone exchange with a call-back device, and a voice mail device for carrying out the method.

BACKGROUND OF THE INVENTION

Telephone exchanges with speech store equipment are already known and are usually called voice mail equipment or devices in the technical language. Such devices are described in great detail in EP 0,087,849 and in EP 0,336,524 for example. A method and a device for storing telecommunication messages are also known from EP 0,304,653.

The task of these installations is that subscribers, who cannot be reached at the moment, initiate a rapid call transfer to the voice mail devices, or a call transfer is initiated after a specified waiting time, if the called subscriber does not answer.

If the transfer is made to a voice mail device and it answers, the telephone signals the number of the called subscriber by means of a Dual Tone Multiple Frequency (DTMF) signals, whereby the calling subscriber is automatically connected with the personal mailbox of the called subscriber.

Now, if all ports of a voice mail device are busy, the subscriber has no possibility of addressing the personal mailbox of the called subscriber. A call-back device is known from EP 0,557,777, which also allows the subscriber to connect with the voice mail device.

Although the calling subscriber can make a call-back to such a mailbox with this call-back device, and after the call-back the calling subscriber is connected with the voice mail device, the calling subscriber is then however placed in the so-called main menu of the voice mail device. Only by again dialing the telephone number of the called subscriber by means of DTMF signals, for which a corresponding telephone set is required, can the calling subscriber be connected with the personal mailbox of the called subscriber.

SUMMARY OF THE INVENTION

The present invention has the task of eliminating this disadvantage, so that after a connection path becomes available, not only the connection to the voice mail device takes place automatically, but also the connection to the personal mailbox of the called subscriber.

The invention fulfills this task in that the control method also stores the telephone number of the called subscriber and, after making a call-back, engages a telephone number directory and sends the telephone number of the called subscriber to the voice mail device, which then connects the calling subscriber with the called subscriber's mailbox.

It is therefore no longer necessary to manually dial the telephone number of the previously called subscriber to access his personal mailbox.

As will be evident from the foregoing, and according to the teachings of the present invention described more fully below, the calling subscriber no longer has to re-enter the called subscriber's telephone number upon automatic call-back when the voice mail device becomes available. There is no longer any need for the tedious reentry of the called subscriber's telephone number by the calling subscriber and much time which was formally wasted is now saved and overall efficiency is improved.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
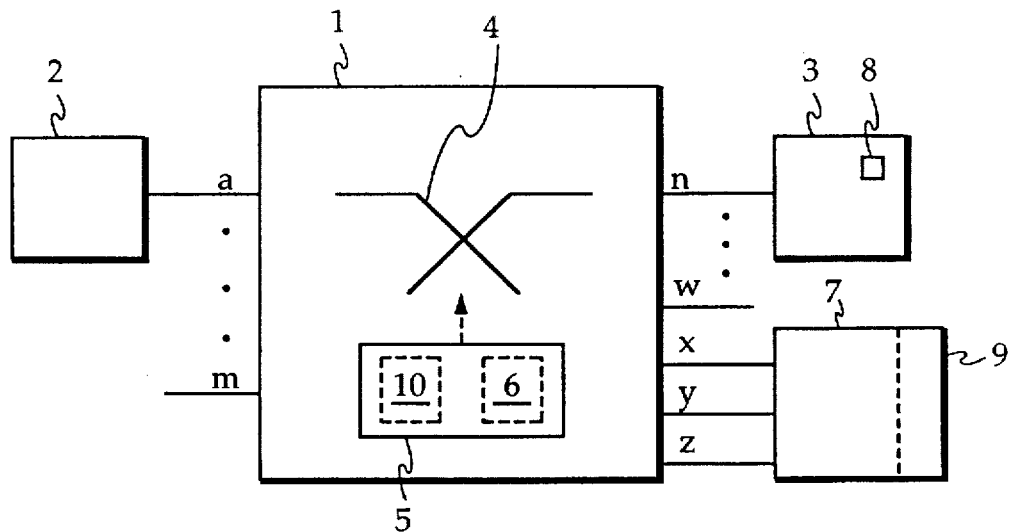
FIG. 1 shows a telephone exchange installation associated with a voice mail device, according to the present invention.

Subscriber terminals are connected to a telephone exchange installation 1 via ports a . . . z. In the present example, ports a . . . w are provided for the connection of telephones 2, 3, and a voice mail device 7 is connected to ports x, y and z.

The telephone exchange installation 1 contains a switching matrix 4, whereby terminals 2, 3, 7 may be connected with each other in the known manner, and which is controlled by a control device 5.

A calling subscriber at telephone 2 can call a called subscriber at telephone 3 for example, thus initiating a control process 10 in control device 5 which is available to control only this call. In this way, there is one control process 10 for each call.

However, it may happen that the called subscriber 3 is not available to talk at that time and has rerouted his connection to the voice mail device 7. If the called subscriber 3 has not activated any call rerouting, this rerouting can nevertheless take place automatically after a specified call time in the known manner.

If the call from the calling subscriber is now rerouted to the voice mail device 7, if a port is open and the voice mail device 7 answers, it receives the telephone number of telephone 3 by means of DTMF signals sent by a DTMF register 6, which is engaged, accessed, or otherwise controlled by the control process 10. The calling subscriber is then connected with the personal mailbox 9 of the called subscriber in the voice mail device 7, and is now able to record messages.

This process usually ends when the calling subscriber hangs up. The respective port of the voice mail device is then ready to receive the next call and the control process 10 is stopped and started again for the next call. The DTMF register 6 is likewise released by the control process 10 immediately after the number of telephone 3 has been sent to the voice mail device 7 and re-engaged once the next call is processed. An LED or a display 8 in the telephone 3 of the called subscriber indicates that a message is waiting in the voice mail device.

If a call from a calling subscriber at telephone 2 has been rerouted from telephone 3, and all voice mail ports x, y, z in a voice mail device 7 are momentarily busy, the calling subscriber at telephone 2 receives a proceed-to-dialtone, which offers him the possibility of an automatic call-back in the known manner. This may be carried out by the control process in conjunction with the DTMF register.

The calling subscriber then orders a call-back in the known manner. The control process 10 stores the telephone number of the calling subscriber for the call-back in the voice mail device 7 in the known manner but, in addition, according to the teachings hereof, the telephone number of the called subscriber at telephone 3 is also stored for a new voice mail function to be described below in detail for use during the subsequent call-back.

The calling subscriber now hangs up telephone 2. The control process 10 remains active and waits for a voice mail port x, y or z to become available.

If a voice mail port x thereafter becomes available, it is reserved by the control process 10, telephone 2 is called and the calling subscriber at telephone 2 lifts the receiver. The control process 10 now calls the voice mail port x and the voice mail device 7 answers.

Up to now, except for the storing of the called subscriber's number, this procedure corresponds to a known voice mail call-back procedure.

However, according to the teachings of the present invention, the control process 10 now engages the DTMF register 6 and sends the stored telephone number of telephone 3 to the voice mail device 7 by means of DTMF signals. Telephone 2 is now automatically connected with the personal mailbox 9 of the called subscriber using telephone 3 in voice mail device 7 and is now able to record messages. The DTMF register 6 is again released by control process 10 after the message is recorded or is otherwise terminated.

The process continues as described above for subsequent calls.

Figure 3:
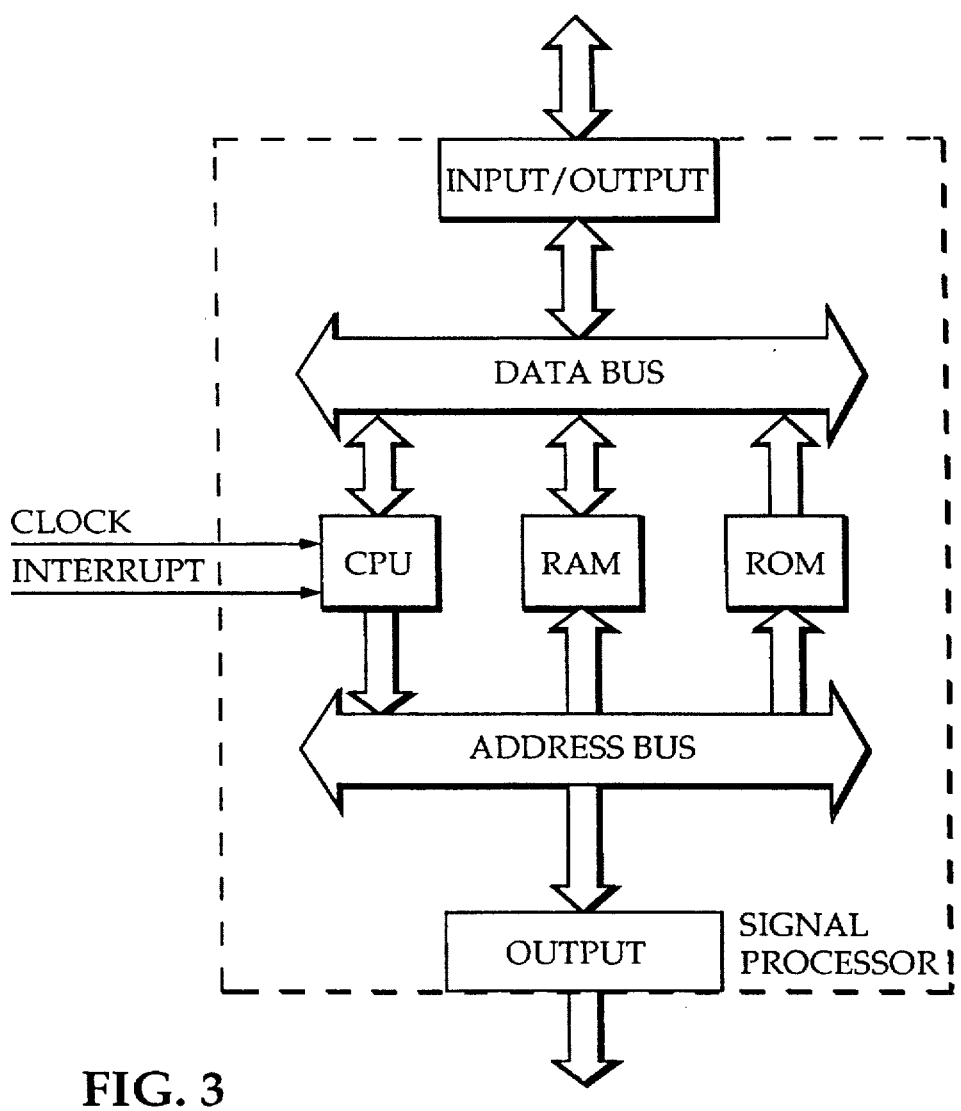
FIG. 3 shows a control device, such as shown in FIG. 1, carried out on a general purpose signal processor.
Figure 2A:
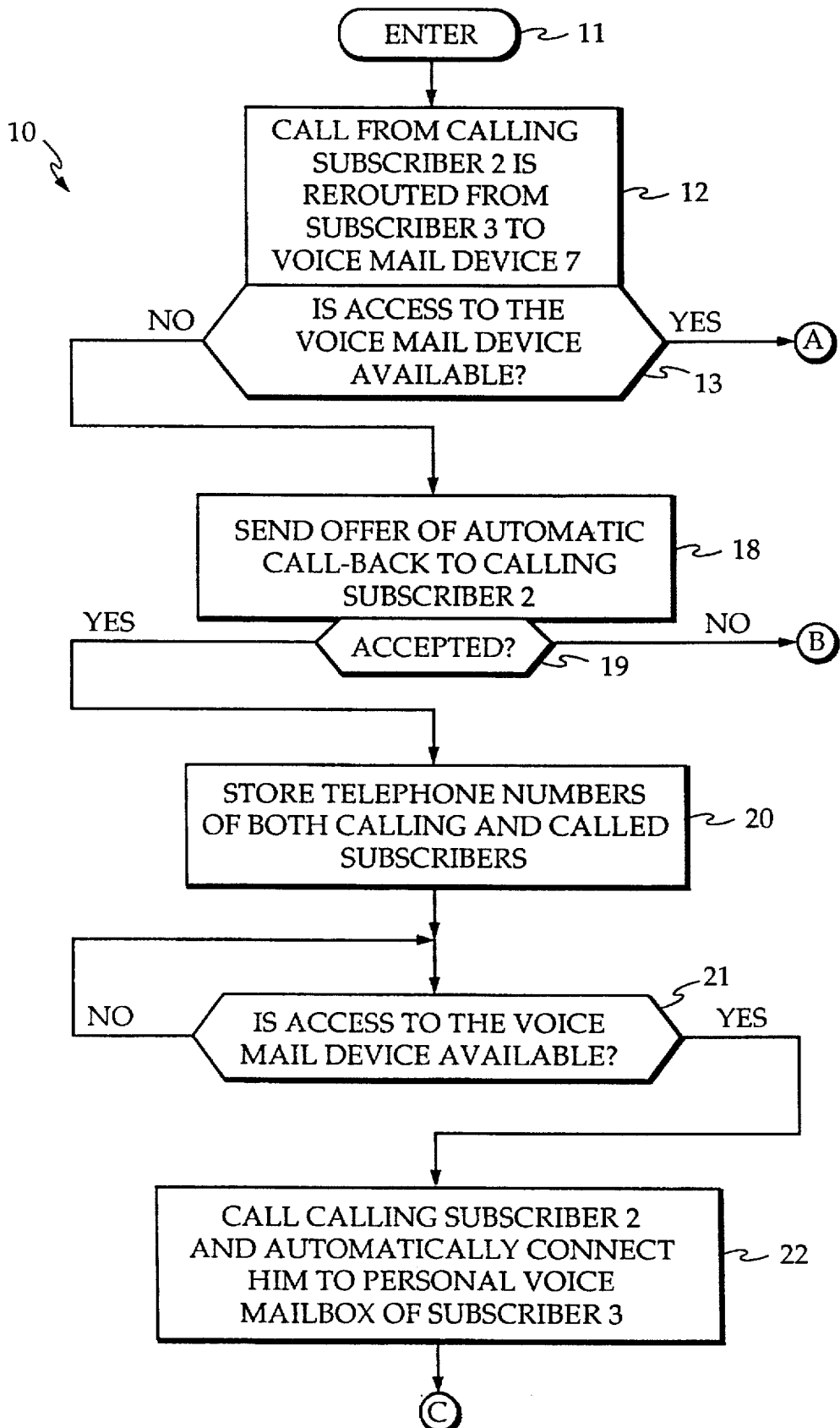
FIGS. 2A and 2B together show a series of steps which may be carried out according to the present invention.
Figure 2B:
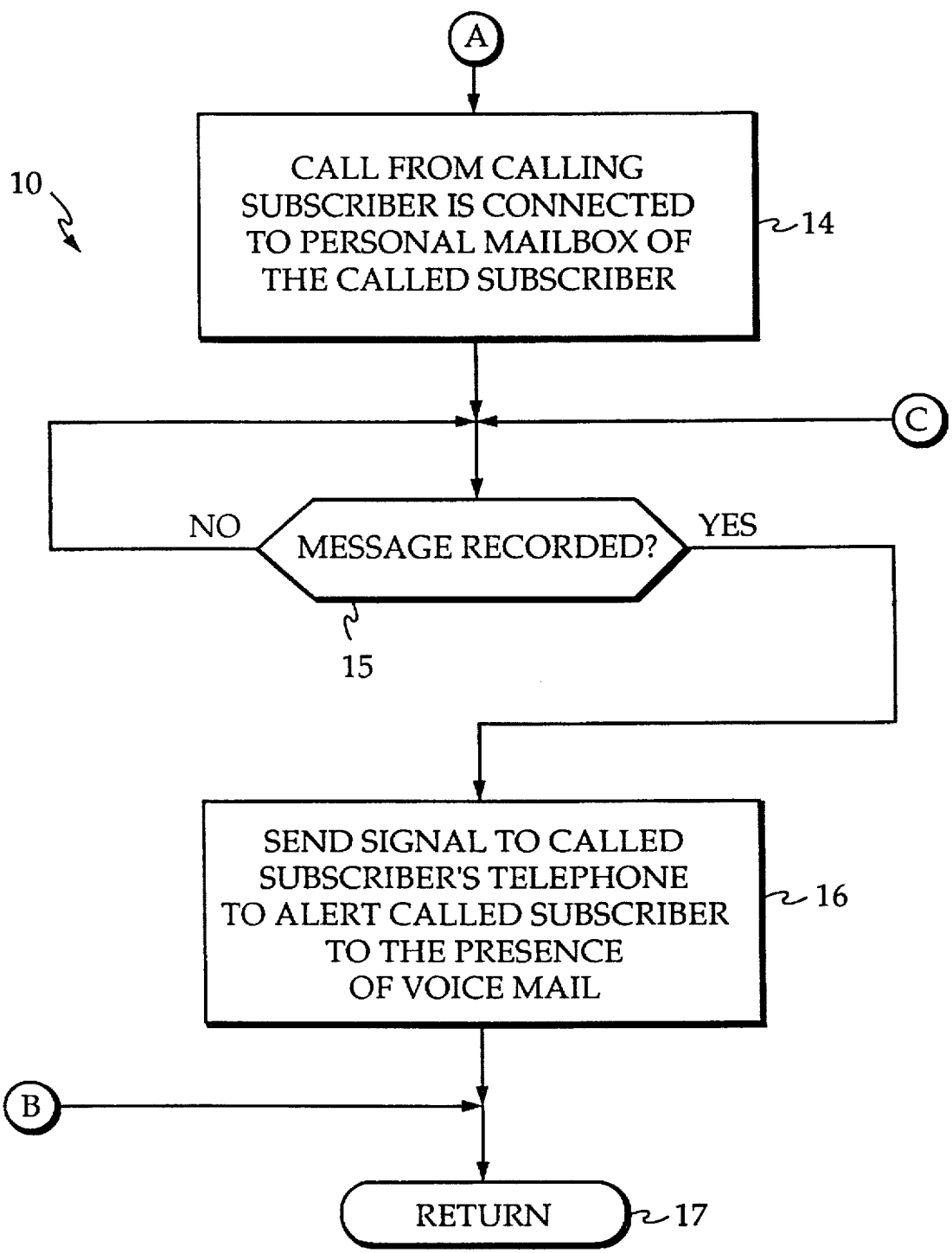

It should be realized that the process 10 carried out by the control device 5 of FIG. 1 may be stored in the form of a set of programmed instructions, such as shown in FIGS. 2A and 2B, in a computer memory such as a read only memory (ROM) associated with a signal processor such as shown in FIG. 3. Such may include a central processing unit (CPU) connected by means of various control, address and data buses to the ROM and to various other devices including a random access memory (RAM), input/output (I/O) devices, timing devices and the like which will be appreciated by those of skill in the art of signal processing. The control device 5 of FIG. 1 may be carried out in its entirety by the signal processor of FIG. 3 or only some of the functions such as the control process 10 may be carried out on such a signal processor. In that case, the signal processor of FIG. 3 will be connected to the register 6 by an input/output port which would also be in communication with the switching matrix 4. It will also be realized that the various functions described herein may be carried out in any number of different ways including discrete components. The sequence of steps described above and below in detail, however, can be very easily carried out by one of skill in the art on a signal processor such as shown in FIG. 3.

Such a sequence of steps may take the general form shown in FIGS. 2A and 2B, which will now be described, without the invention being limited thereto. After entering in a step 11, the control process 10 executes a step 12 where a call from the telephone 2 of a calling subscriber is rerouted from the telephone 3 of the called subscriber to the voice mail device 7 to seek access to the personal mailbox of the called subscriber. A decision step 13 is next executed in order to determine if access to the voice mail device 7 is available. If so, referring to FIG. 2B, a step 14 is next executed whereby the call from the calling subscriber is connected to the personal mailbox of the called subscriber. The calling subscriber leaves his voice message and after it is determined in a step 15 that the completed message has been recorded or otherwise terminated, a step 16 is executed in order to signal the called subscriber's telephone to alert him, e.g., by means of an LED, to the presence of voice mail for him in the voice mail device 7. A return is then made in a step 17.

If, on the other hand, a determination is made in the step 13 of FIG. 2A that access to the voice mail device is not then available to the calling subscriber, a step 18 is executed instead in order to give the calling subscriber the opportunity to choose the option of having an automatic call-back initiated when a port of the voice mail device 7 becomes available. If the option is not accepted by the calling subscriber, as determined in a step 19, a return is made directly by way of the step 17 of FIG. 2B. However, if accepted, according to the teachings of the present invention, the telephone numbers of the telephones 2, 3 used by both the calling and called subscribers are stored by the control process 10, e.g. in the above-described signal processor's RAM as indicated in a step 20. A decision step 21 is then executed until it is determined that access to the voice mail device has become available. After that, a step 22 is executed to automatically establish a connection between the calling subscriber's telephone 2 and the personal voice mailbox in the voice mail device 7 of the called subscriber, using the telephone number of telephone 3. A transition is then made to the steps 15, 16, 17 of FIG. 2B in order to allow the message to be recorded and a signal to be sent to the called subscriber's telephone 3 to alert him to the presence of voice mail.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A telephone exchange (1) with a voice mail device (7), which stores voice messages arriving from a first telephone (2) used by a first subscriber and intended for a second subscriber using a second telephone (3) in a mailbox (9) assigned to the second subscriber, and to send the voice messages to the second telephone (3) upon the second subscriber's request, where the telephone exchange (1) includes a control device (5) which contains a process control (10) for controlling a selected mailbox (9), where in the event that all connection paths (x, y, z) to the voice mail device (7) are busy during a call made by the first subscriber, who then orders an automatic call-back when a connection path of the voice mail device becomes available, the process control (10) stores a telephone number of the voice mail device (7) and, after a connection path (x, y, z) becomes available, keeps it open for the first subscriber, then calls the first subscriber and, after the first subscriber lifts the receiver of the first telephone (2), connects the first subscriber with the voice mail device (7), characterized in that the process control (10) after said first subscriber orders the automatic call-back also stores the telephone number of the second telephone (3) and, after performing the automatic call-back sends the telephone number of the second telephone (3) to the voice mail device (7), which then connects the first telephone (2) with the mailbox (9) of the second subscriber.

2. A method for storing voice messages by way of a telephone exchange (1) in a voice mail device (7) which stores voice messages arriving from a first telephone (2) used by a first subscriber calling a second subscriber at a second telephone (3) in a mailbox (9) assigned to the second subscriber (3), and to send a stored voice message to the second telephone upon the second subscriber's request, wherein the telephone exchange (1) includes a control device (5) which contains a control process (10) for control of access to the mailbox (9), where in the event that all connection paths (x, y, z) to the voice mail device (7) are busy during a call made by the first subscriber, who then orders a call-back, the control process (10) stores a telephone number of the voice mail device (7) and, after a connection path (x, y, z) becomes available, keeps it open for the first subscriber, then calls the first subscriber at the first telephone (2) and, after the first subscriber (2) lifts the receiver of the first telephone (2), connects the first subscriber with the voice mail device (7), characterized in that the control process (10) after said first subscriber orders the automatic call-back, also stores a telephone number of the second telephone (2) used by the second subscriber and, after performing the call-back sends the telephone number of the second telephone (3) to the voice mail device (7), which then connects the first telephone (2) with the mailbox (9) of the second subscriber (3) for recordation of a voice message from the first subscriber to the second subscriber.

3. A voice mail method for use with a telephone exchange connected to a plurality of subscriber telephones and to a voice mail device, comprising the steps of:

determining that a telephone call from a calling subscriber at a first telephone (2) has been attempted from a second telephone (3) of a called subscriber to the voice mail device (7);

determining whether access to the voice mail device is available and, if not, sending an offer of automatic call-back to the calling subscriber at the first telephone and, if accepted, storing the telephone numbers of the first and second telephones as well as the telephone number of the voice mail device;

determining subsequently that access to the voice mail device is available; and using the stored telephone number of the first telephone to call the first telephone and using the stored telephone number of the second telephone to automatically connect the first telephone to the personal voice mailbox of the called subscriber for recordation of a voice message by the calling subscriber.

* * * * *

UNITED STATES PATENT AND TRADEMARK OFFICE
CERTIFICATE OF CORRECTION

PATENT NO. : 5,555,292
DATED : September 10, 1996
INVENTOR(S) : Eckhart

It is certified that error appears in the above-indentified patent and that said Letters Patent is hereby corrected as shown below:

At column 5, line 9, after "(10)", please insert a --,--; and
    at line 10, after "call-back", please insert a --,--.

Signed and Sealed this

Tenth Day of December, 1996

Attest:

BRUCE LEHMAN

Attesting Officer

Commissioner of Patents and Trademarks